Oct. 23, 1962 S. B. BRINKMAN ET AL 3,059,634
POWER OPERATED OVEN RACK

Filed Jan. 20, 1960 5 Sheets-Sheet 1

INVENTORS
Susan B. Brinkman.
BY Herbert C. Brinkman, Jr.
Wood, Herron & Evans.
ATTORNEYS.

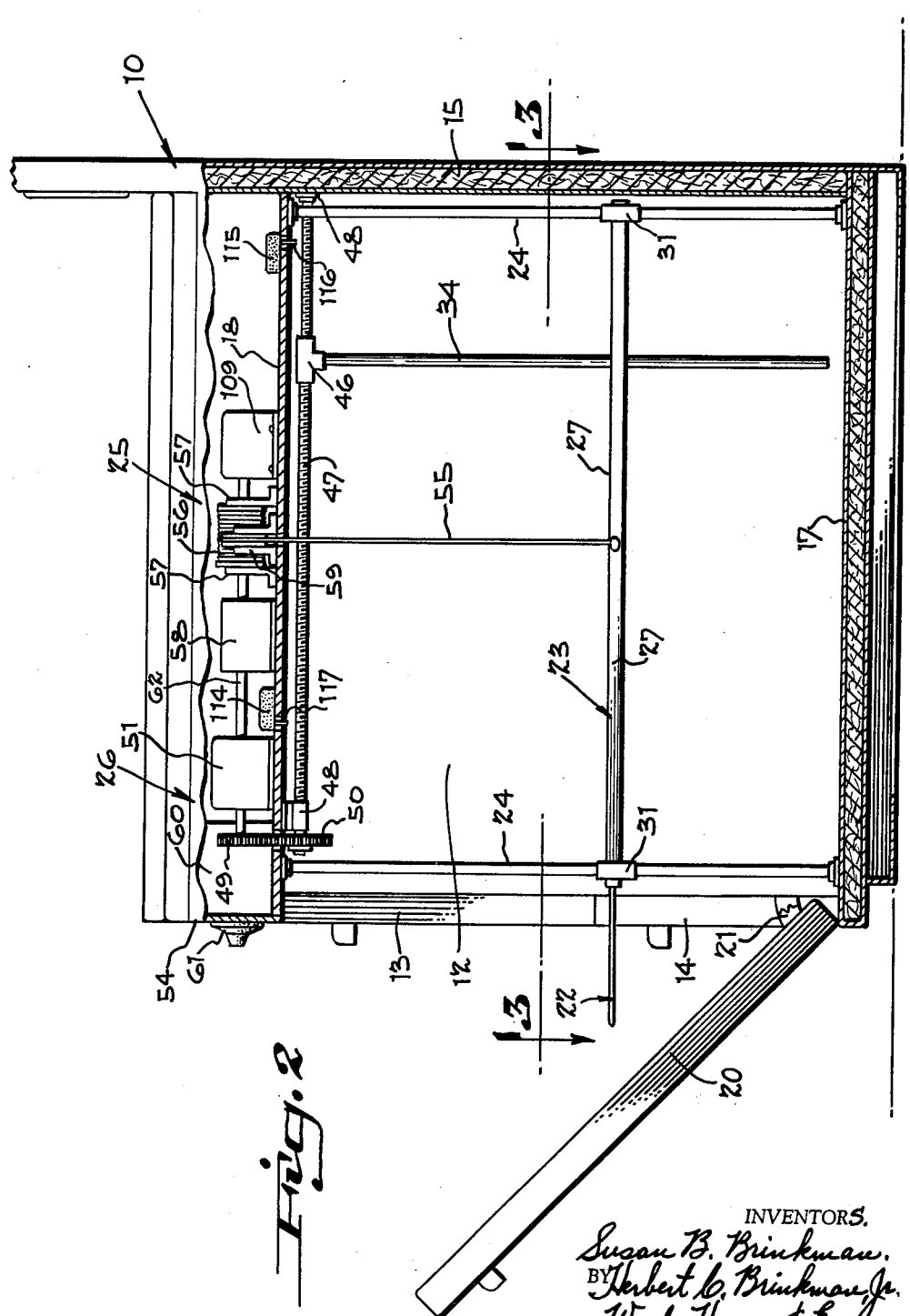

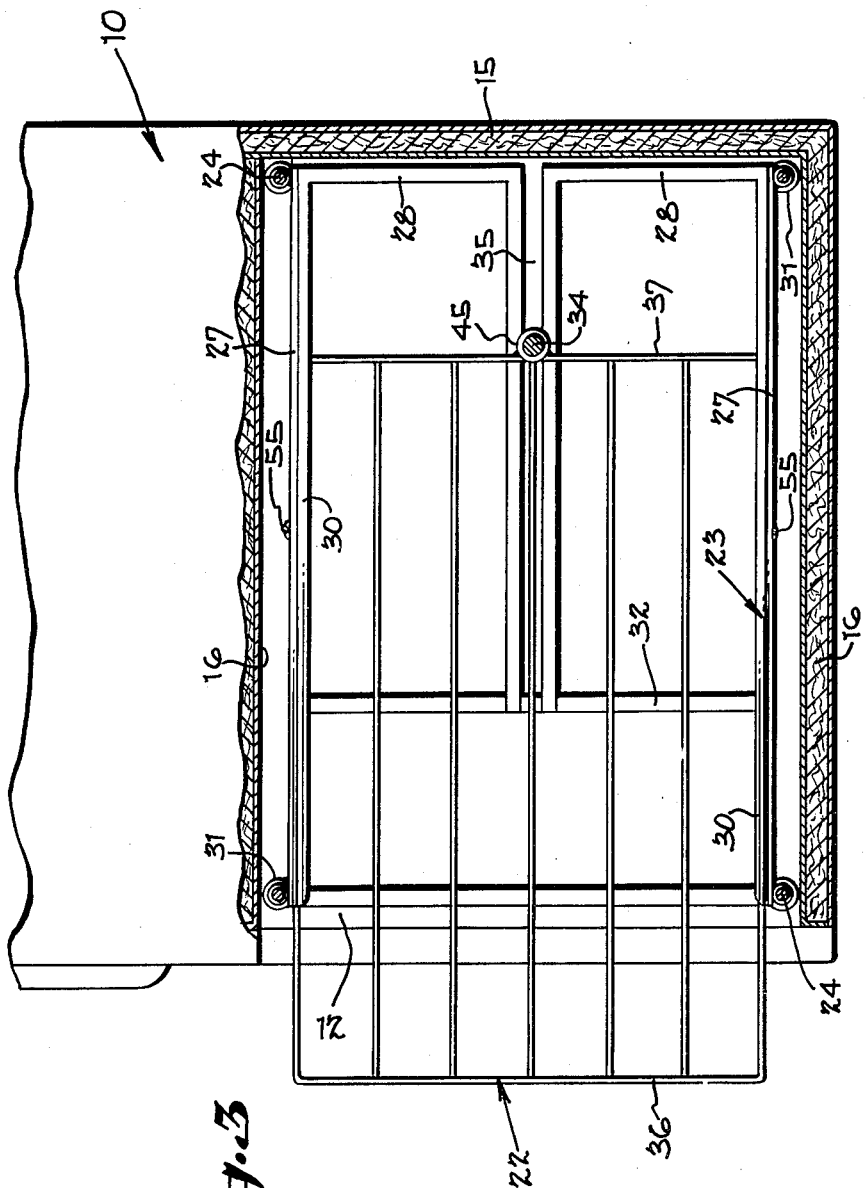

3,059,634
POWER OPERATED OVEN RACK
Susan B. Brinkman and Herbert C. Brinkman, Jr., both of 3419 Aultview, Cincinnati, Ohio
Filed Jan. 20, 1960, Ser. No. 3,649
14 Claims. (Cl. 126—337)

This invention relates to racks of the type used in ovens, broilers, or the like, and is particularly directed to a rack construction including electric motor driving means for selectively raising and lowering the rack and for shifting it into and out of the oven chamber.

At the present time, conventional domestic ovens are provided with wire racks for supporting pans, casseroles, and other cooking utensils. In a typical oven, this rack is slidably mounted upon projections, or rails, formed on the inner walls of the oven chamber. Frequently, it is necessary for a housewife to remove the food being cooked from the oven during the baking operation for inspection, basting, turning, and the like. Also, it is sometimes desirable to cook a particular food in one portion of the oven for a part of its total cooking time and in a second portion of the oven for the remainder of the cooking time.

Conventional oven racks of the type described are very inconvenient for this purpose. In the first place, the oven racks in many ovens are placed rather low, in a position where they are inconvenient to reach. Moreover, in use they become extremely hot so that before adjusting the rack or pulling it outwardly to render the food more accessible, the housewife must first locate a pot holder, towel, gloves, or the like. Another serious disadvantage of such racks is at times they tend to stick and when the housewife pulls hard enough on the rack to loosen it, the rack moves very suddenly so that the food container at times falls off the innermost end of the rack into the oven. It is also an extreme nuisance to shift the height of such a rack during a baking operation, since the hot container must first be removed from the oven and placed on a counter or the like, while the rack is manually removed from engagement of one set of rails and placed on another set.

Moreover, the excessive agitation of the food container involved in such a shifting is injurious to certain types of pastry and other types of foods. From the point of view of the housewife, racks of this type are also disadvantageous since the housewife is frequently burned by contact with a rack or other part of an oven or by spattering grease from the food stuff being prepared.

The principal object of the present invention is to provide an oven construction in which electrically operated motor means are provided for raising and lowering the rack and for advancing it and retracting it into and out of the oven. In using the present invention, a housewife automatically raises or lowers the rack to any desired position by merely manipulating a conveniently positioned dial, push buttons, or other suitable control elements. Additionally, the housewife can cause the rack to be advanced to an accessible position outside the oven by pressing one button and can cause the rack to be retracted to a position completely within the oven by pressing a second button. Thus, the housewife can position the rack in any manner desired without having to touch the rack or placing either her hands or arms inside the oven.

One preferred form of oven constructed in accordance with the principles of the present invention includes a rack slidably mounted for in and out movement on a carrier frame. The rack is driven by means of a pusher rod which slidably engages a sleeve disposed adjacent to the rear edge of the rack. The pusher rod depends from a drive screw which is adapted to be rotated by a drive motor controlled from push buttons on a panel of the stove.

The rack is supported along its edges by means of ball bearing slides, or the like, which offer a minimum amount of frictional resistance; and at the same time are effective to support the rack in any position from its innermost position within the oven to its extended position in which the rack projects outwardly through the oven opening.

The carrier is mounted for vertical movement by means of four sleeves which slidably engage four corner posts. The carrier is adapted to be raised and lowered by means of a drive including cables engaging the carrier and adapted to be found about a drum drive by a suitable motor. The motor is controlled from a vertical positioning control unit including a selector dial mounted upon the oven panel. The selector dial is provided with a plurality of markings corresponding to various heights of the carrier frame and rack within the oven.

One of the principal advantages of the present invention is that it does not interfere in any way with the usable space in the oven. The present oven rack is substantially the same size as the rack of a conventional oven of the same size. Moreover, the rack can be shifted throughout substantially the entire height of the oven chamber.

Another advantage of the present oven construction is that the rack can be shifted in and out in any vertical position; and likewise can be raised or lowered whether the rack is disposed within the oven or projects outwardly from the oven.

One important object of the present invention is to provide a vertical positioning control means which is of simple construction and which eliminates the possibility of the rack being raised to the top of the oven, crushing the foodstuffs, while the rack is being shifted from one position to another.

This objective is achieved by providing a control including a rotatable member, the position of which is at all times correlated with the position of the rack. The rotatable member is disposed to cooperate with a switch actuating member which is adjustably positioned by the positioning dial in accordance with the desired position of the oven rack.

When the dial is initially rotated to select the rack position, a motor is energized through a biased circuit which always drives the motor down. If the selected position is below the previous rack position, the rack is stopped on the way down. When the rotatable member is brought into registry with the actuating member, a switch is actuated to stop the drive motor. If on the other hand the selected position is above the previous position, the rack is first driven to its lowermost position where its movement is automatically reversed. The rack then moves upwardly to its selected position. The rack therefore is prevented from ever reaching a position higher than the selected position.

These and other objects and advantages of the present invention will be more readily apparent from a consideration of the following detailed description of the drawings showing a preferred embodiment of the invention.

In the drawings:

FIGURE 2 is a transverse cross-sectional view of the oven and rack.

FIGURE 3 is a cross-sectional view taken along line 3—3 of FIGURE 2.

Figure 1:
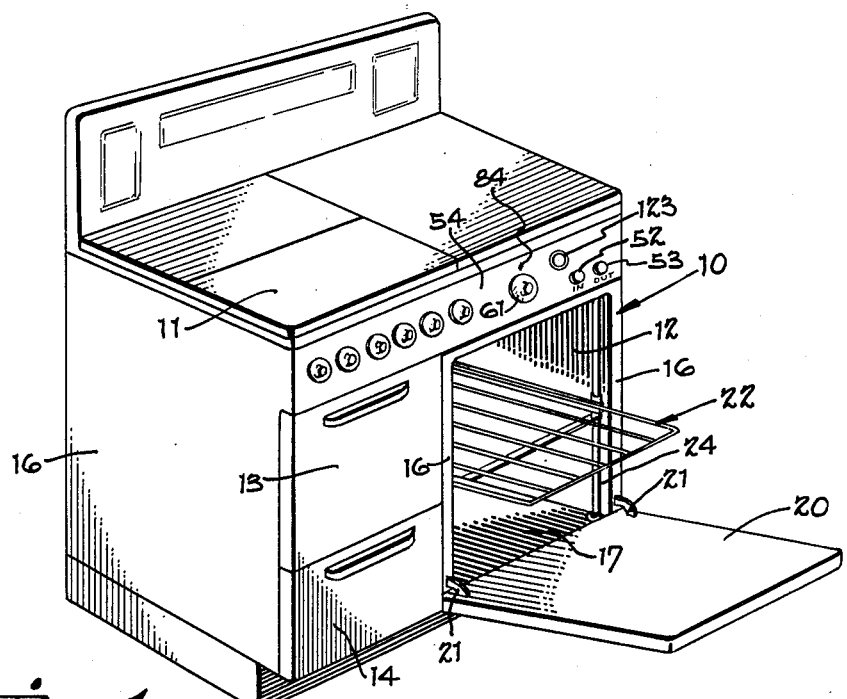
FIGURE 1 is a perspective view of one form of oven provided with a rack constructed in accordance with the present invention.

One typical stove provided with an oven rack constructed in accordance with this invention is shown in FIGURE 1. As there shown, stove 10 is of generally conventional construction and includes a frame, a burner section 11, an oven compartment 12, a broiler compartment 13, and a storage drawer 14. The heating elements of the burner, oven, and broiler can be either electrical resistance units or gas burners. It is to be understood that while the present rack is specifically disclosed in this type of oven, the rack is equally adaptable for use in broilers or in other types of ovens, such as wall ovens and the like.

As is shown in FIGURE 2, oven chamber 12 is enclosed by rear wall 15, side walls 16, bottom wall 17 and top wall 18. The side, rear, and bottom walls are preferably formed of spaced sheet metal panels separated by a suitable insulating material. A door 20 is pivotally mounted as at 21 adjacent to the forward edge of bottom wall 17.

The oven chamber is provided with a rack or shelf 22 for supporting the food being cooked. This rack can be of any desired type, one suitable form comprising a plurality of wires welded to form a rectangular member having a plurality of spaced stringers. Rack 22 is supported for in and out movement upon a carrier frame 23. Carrier frame 23 is in turn supported for vertical movement along corner posts 24. The carrier frame is raised and lowered by elevating mechanism 25 and rack 22 is adapted to be shifted in and out along frame 23 by the rack advancing mechanism 26.

Figure 4:
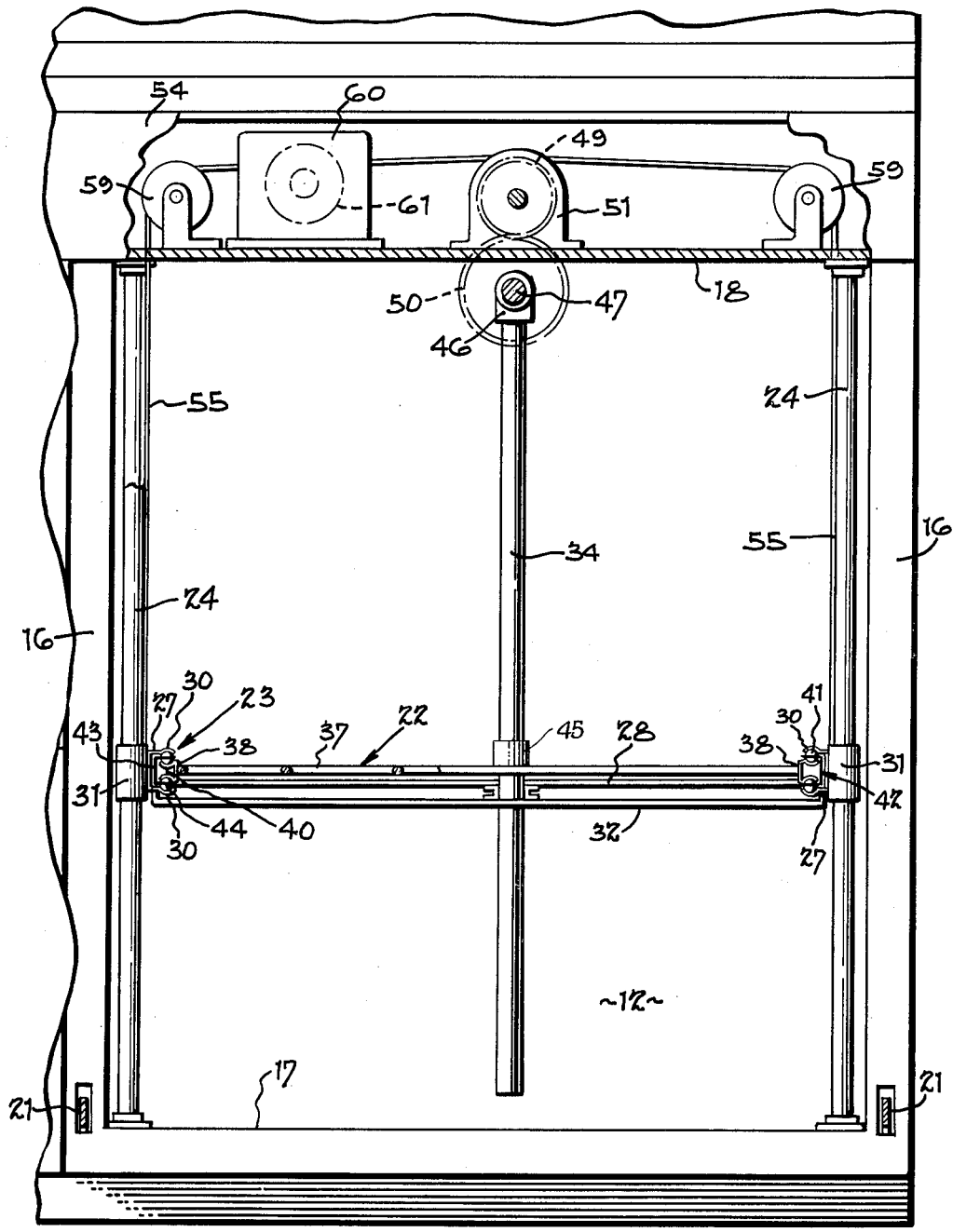
FIGURE 4 is a front view of the oven and rack, part of the oven and walls being broken away to show details of the construction.

More particularly, as is best shown in FIGURES 3 and 4, carrier frame 23 is of generally U-shaped configuration including spaced longitudinal arms 27 and rear members 28. In a preferred embodiment, arms 27 are generally channel shaped including spaced parallel upper and lower ball receiving grooves 30—30. Each of the arms 27 carries sleeves 31—31 disposed adjacent to the ends of the arms. Sleeves 31 are slidably mounted upon posts 24 which are welded or otherwise secured to top and bottom walls 18 and 17 of oven 12 at the four corners thereof. Sleeves 31 loosely embrace posts 24; but the sleeves are sufficiently elongated to prevent appreciable canting of the carrier frame.

Frame 23 further comprises a cross bar 32 which extends transversely between the two longitudinal arms 27—27. As is shown in FIGURE 4, cross bar 32 is preferably welded to the underside of arms 27. The cross bar carries the forward end of two center channel members. These center channel members extend longitudinally of the frame from rear members 28 to cross bar 32, the channel members being joined to the cross bar and rear members as by welding. These channel members are disposed beneath the level of longitudinal channel members 27 and are spaced apart a sufficient distance to accommodate a rack pusher rod 34. It is to be understood that the center channel members are of sufficient length to form a runway 35 effective to accommodate the travel of rod 34 from its rearmost position in which the oven rack 22 is completely withdrawn within the oven, to its outermost position in which the oven rack projects from the oven as is shown in FIGURE 1.

As is best shown in FIGURES 3 and 4, oven rack 22 is generally rectangular and comprises a front cross member 36, a rear cross member 37, and longitudinal side members 38. Side members 38 are generally U shaped and include upper and lower ball receiving tracks 40. These tracks 40 are disposed between tracks 30 formed on arms 27 of the carrier frame. A plurality of ball bearings 41 are carried between the upper and lower tracks of the carrier frame and movable rack. In addition, a channel shaped ball-spacer 42 is disposed between the channels of each of the arms 27. Each of these ball spacers 42 includes a vertical wall 43 and upper and lower horizontal walls 44. Walls 44 are provided with a plurality of spaced openings, each adapted to loosely receive and retain one of the ball bearings 41. Preferably, suitable cooperating abutment means (not shown) are provided on the spacers, rear portions of side members 38 and arms 27 to limit outward movement of the spacer members and rack relative to the arms 27.

The rear cross member 37 of rack 22 carries a bearing sleeve 45 for slidably receiving pusher rod 34. Pusher rod 34 is welded or otherwise secured to an elongated threaded sleeve 46. Threaded sleeve 46 is carried by an elongated driving screw 47. Rod 34 extends downwardly from this screw 47 substantially to the bottom of the oven. Driving screw 47 is rotatably journalled in bearings 48 mounted in the front and rear of the oven chamber. When screw 47 is rotated, sleeve 46 is shifted forwardly or rearwardly along the screw. Sleeve 46 carries rod 34 and this rod in turn, through its engagement with sleeve 45, forces rack 22 in and out relative to carrier frame 23.

The drive for rotating screw 47 is best shown in FIGURE 2. As there shown, screw 47 carries a gear 50. This gear meshes with gear 49 mounted upon the output shaft of a suitable motor and gear reduction unit 51. This motor is controlled by push button switches 52 and 53, or the like, mounted on the front panel 54 of the stove as is explained below.

The elevation of the rack is controlled by raising and lowering carrier frame 23. More particularly, as is best shown in FIGURES 2 and 4, an elevating cable 55 is secured to each of the longitudinal arms 27 of the carrier frame adjacent to the center portions thereof. These cables are reversely wound about a drum 56 mounted above wall 18, the cables passing over pulleys 59 mounted in any suitable manner on wall 18 and downwardly through suitable openings in the wall. Drum 56 is rotatably journalled in bearing blocks 57. This drum is preferably mounted directly upon the elongated output shaft of a motor and gear reduction unit 58. Motor 58 also is connected to a vertical positioning switch unit 60, preferably mounted behind panel 54. A dial 61, or the like, is mounted on panel 54 to provide a readily accessible control for the rack elevating mechanism.

Figures 6, 7:
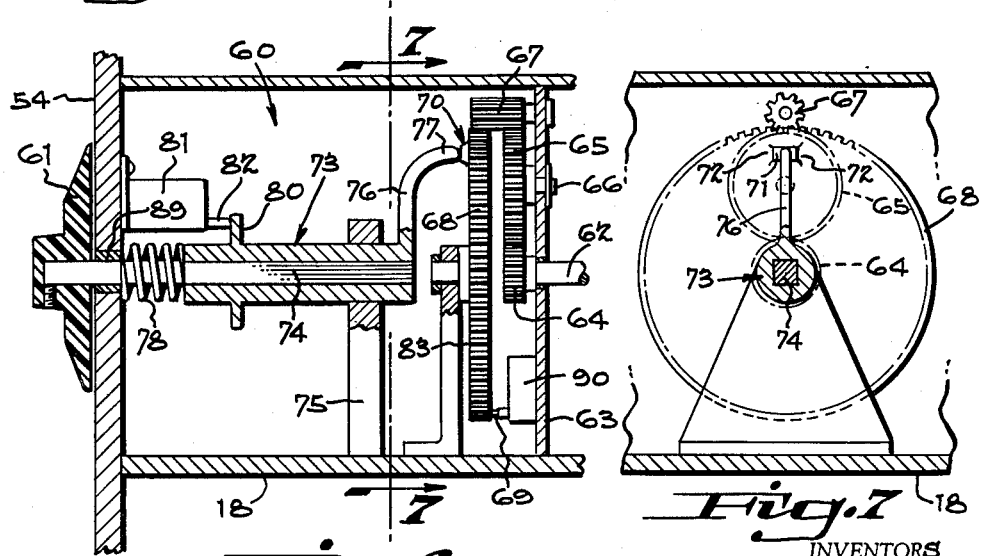
FIGURE 6 is a cross-sectional view through the vertical positioning switch unit.
FIGURE 7 is a cross-sectional view taken along line 7—7 of FIGURE 6.
Figure 5:
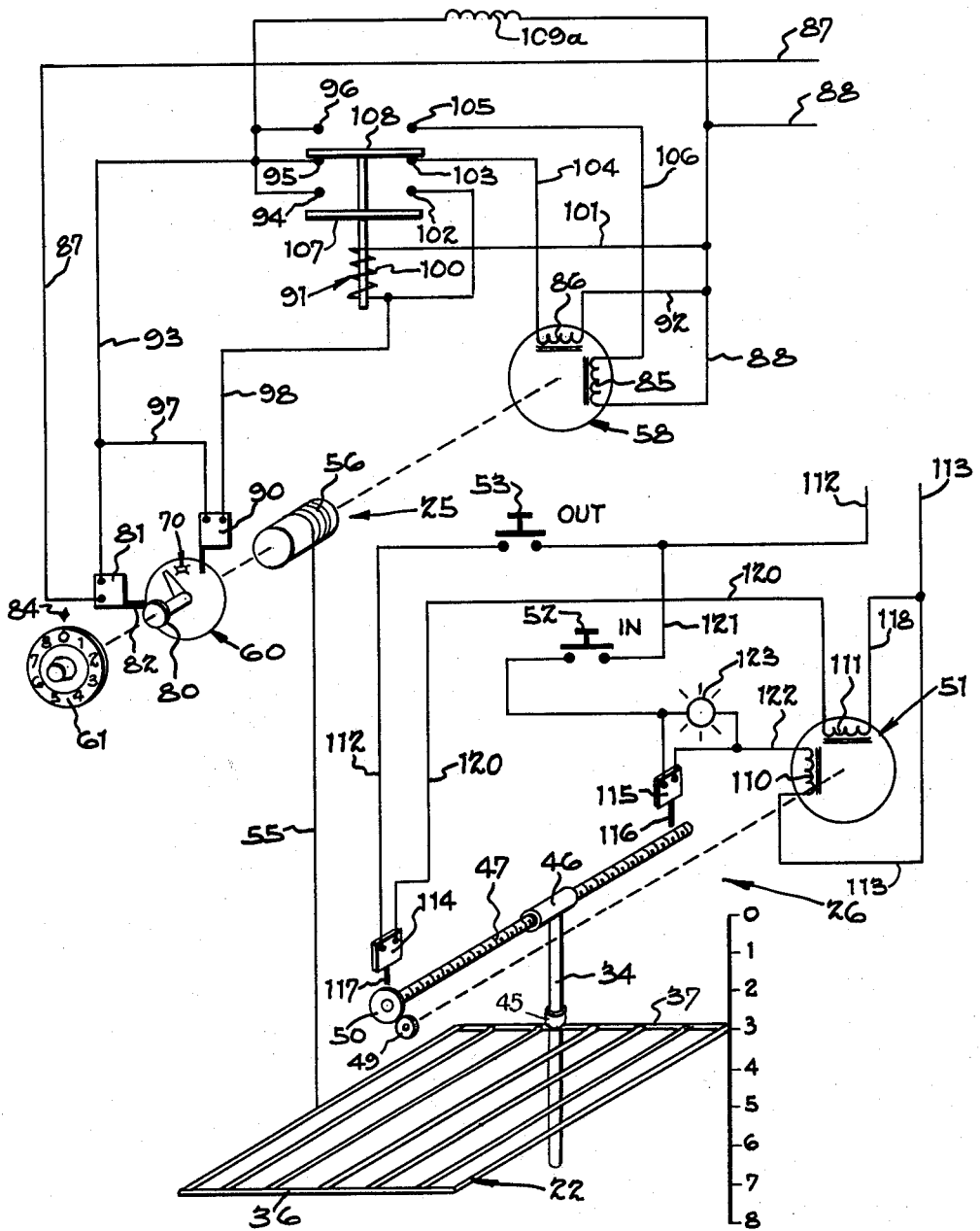
FIGURE 5 is a digrammatic view showing the electrical control circuits for positioning the rack.

The details of the vertical positioning switch unit are best shown in FIGURES 5–7. As there shown, a shaft 62 extends forwardly from vertical positioning motor 58. This shaft is journalled in a bushing mounted in wall 63. Shaft 62 carries a small pinion 64 which drives a large idler gear 65 mounted upon pin 66. Gear 65 in turn drives small gear 67 which meshes with large gear 68. Gears 64, 65, 67, and 68 form a gear reduction unit effective to rotate gear 68 one revolution as the carrier frame 23 is shifted from its lowermost to its uppermost position.

Gear 68 carries on its outer face a cam projection 70 having a flat outer surface 71 and sloping edges 72. Since gear 68 rotates one revolution during the maximum shifting of the carrier frame, the rotational position of cam 70 at all times corresponds to the elevational position of the carrier frame 23. Gear 68 also carries a projection 69 which is adapted to engage a finger of down limit switch 90 when the carrier frame 23 reaches the lowermost portion of the over chamber.

Cam projection 70 is disposed for cooperation with a plunger 73. Plunger 73 is slidably mounted on a square shaft 74. Plunger 73 is rotatably journalled in a mounting bracket 75. The inner end of plunger 73 is provided with a radially extending arm 76 having a projecting finger 77 formed on its outer end. The outer end of plunger 73 is engaged by a spring 78 which is compressed between panel 54 and the plunger. Plunger 73 also is provided with an annular flange 80 spaced from the outer end of the plunger.

Flange 80 is adapted to open normally closed switch 81 by depressing switch finger 82. Spring 78 is normally effective to shift plunger 73 away from panel 54 and switch 81 a sufficient distance so that flange 80 does not depress switch finger 82. Movement of plunger 73 in this direction is limited by the engagement of finger 77 with the face 83 of gear 68.

The outer end of shaft 74 engages a bearing sleeve 89 which is journalled in panel 54. Dial 61 is fixedly mounted on the outer end of shaft 74. Dial 61 is provided with suitable spaced peripheral markings to indicate the desired elevational position of carrier frame 23 and rack 22. In the specific embodiment shown, dial 61 is provided with markings "0"–"8," the "0" marking corresponding to the uppermost position of rack 22 and the "8" marking corrseponding to the lowermost position as is indicated diagrammatically in FIGURE 5. Thus, the height of rack 22 can be selected by merely rotating dial 61 until the desired height marking is opposite marking 84 on panel 54.

The control system for positioning carrier frame 23 and rack 22 in accordance with the position of dial 61 is shown in FIGURE 5. As there shown, motor 58 is a reversible motor having windings 85 and 86, the carrier frame and rack being raised when winding 85 is energized and being lowered when winding 86 is energized. Motor 58 is energized from power lines 87 and 88 through a circuit which includes positioning switch 81, limit switch 90, and double pole throw relay 91.

More particularly, line 88 is connected to one lead of winding 85 and is joined through conductor 92 to a lead of winding 86. Line 87 is connected to one terminal of normally closed switch 81. The other terminal of this switch is connected to lead 93. Lead 93 is joined to stationary contacts 94, 95 and 96 of relay 91. Lead 93 is also joined through lead 97 to one terminal of limit switch 90. The other terminal of the limit switch is connected through lead 98 to one terminal of coil 100 of relay 91, the opposite terminal of this relay being returned to line 88 through lead 101. Lead 98 is also connected to relay contact 102. The second lead of "down" coil 86 is connected to terminal 103 of relay 91 through conductor 104; while the second lead of winding 85 is joined to contact 105 through conductor 106. Relay 91 includes movable contacts 107 and 108 respectively adapted to bridge contacts 94 and 102; and contacts 95 and 103 and 96 and 105.

The rack is held in position by means of a solenoid operated friction brake 109. This brake normally prevents rotation of the output shaft of motor 58. However, when motor 58 is energized the solenoid of brake 109 is energized to release the motor output shaft for rotation. As shown in FIGURE 5, the solenoid coil 109a of brake 109 is connected across lines 93 and 88.

The control circuit for controlling in and out movement of rack 23 is also shown in FIGURE 5. As is there shown, motor 51 is reversible and includes "in" coil 110 and "out" coil 111. Motor 51 is adapted to be energized from power lines 112 and 113 through a circuit including normally closed limit switches 114 and 115 and "in" and "out" selector switches 52 and 53. As is shown in FIGURE 2, switches 114 and 115 are mounted above wall 18. These switches respectively have fingers 116 and 117 which depend through suitable openings in wall 18 disposed adjacent to the rearward and forward limits of the movement of sleeve 46.

Line 113 is joined to one lead of winding 110 and to one lead of winding 111 through conductor 118. Line 112 is connected through selector switch 53 to one terminal of "out" limit switch 114. The other terminal of this switch is joined to the opposite lead of winding 111 through conductor 120. Line 112 is also joined through lead 121 and selector switch 52, to "in" limit switch 115. The other terminal of switch 115 is connected to the second lead of winding 110 through conductor 122.

In operation, the door of the oven is manually opened in the usual manner. The "out" push button 53 is then pushed. This completes a circuit to motor 51 which rotates drive screw 47, through the gear reduction unit associated with the motor. As screw 47 rotates, sleeve 46 is shifted outwardly carrying pusher rod 34 outwardly. The pusher rod engages sleeve 45 mounted upon rack 22 and forces the rack outwardly, the rack moving easily in its ball bearing supports. It will be noted that rod 34 is effective to shift rack 22 outwardly irrespective of the height of the rack. Push button 53 is held in until the rack projects the desired distance from the oven. Excessive outward movement of the rack is prevented by limit switch 114 which opens the circuit to motor 51 when sleeve 46 trips finger 117.

Assume the rack is not at the desired height, but is at level "7" for example, and it is desired to raise the rack to more conveniently place the foodstuff container on the rack. Dial 61 is rotated to position "0." This rotates plunger 73 and causes finger 77 to slide off cam 70. This permits plunger 73 to be shifted inwardly under the influence of spring 78 until finger 77 engages face 83 of gear 68. When plunger 73 is shifted inwardly, flange 80 releases finger 82, closing switch 81 and energizing brake solenoid 109a. Since the coil of relay 91 is manually deenergized, this completes a circuit through relay contacts 95 and 103 to "down" coil 86 of motor 58. The motor drives drum 56 through its gear reduction unit. Drum 56 unwinds cables 55 lowering carrier frame 23 and rack 22, sleeve 45 sliding along rod 34. When the carrier frame reaches the bottom of the oven, projection 69 on gear 68 closes switch 90, completing a circuit to coil 100 of relay 91. This opens the circuit to motor coil 86 of motor 58 and closes a circuit to motor coil 85. This causes a reversal in the direction of rotation of motor 58. Relay coil 100 is held in by its hold in contacts 94 and 102 which complete a circuit through the coil to lines 87 and 88.

Motor 58 continues to operates, rotating drum 56 and raising carrier frame 23 until cam projection 70 engages finger 77 and shifts plunger 73 against the force of spring 78. This opens switch 81 and deenergizes motor 58, stopping the carrier at the desired height. When switch 81 opens, brake solenoid coil 109a is deenergized so that the brake clamps the output shaft of motor 58 in place, preventing any vertical movement of the rack. Relay coil 91 is also deenergized. After the foodstuffs have been placed on rack 22, dial 61 is turned to the desired position of rack 22 for the baking operation. The rack automatically positions in the manner explained above.

Thereafter, the "in" selector button 52 is pressed. This completes a circuit to coil 110 of motor 51. The motor drives screw 47 which forces sleeve 46 inwardly. Sleeve 46 carries rod 34 inwardly and this rod through its engagement with sleeve 45, carries rack 22 inwardly. Button 52 is held in until a neon lamp 123 connected across switch 115 lights. This shows that "in" limit switch 115 has opened, deenergizing motor 51 and stopping the rack in its innermost position. The oven door is then closed.

If at any time during the baking operating, it is desired to change the height of rack 22, dial 61 is merely shifted to a new position corresponding to the desired height of the rack. The rack is then automatically driven to its new position, as explained above. It will be noted that the rack always moves down to the bottom of the oven and then up to the desired position. This prevents the foodstuffs from being crushed against the top wall 18 as might be the case if the movement of rack 22 were not biased downwardly. After the baking operation, the oven door is opened and "out" button 53 is pressed to cause rack 23 to be projected out through the oven opening as before to facilitate removal of the foodstuffs.

From the foregoing disclosure of the general principles of the present invention and the above description of a preferred embodiment, those skilled in the art will readily comprehend various modifications to which the invention is susceptible. For example, carrier frame 23 can be spring biased downwardly if desired. Alternatively, each of the cables 55 can be wrapped around drum 56 and one end of each cable can be passed over a pulley mounted adjacent to the bottom of the oven and then secured to the carrier frame adjacent to the end of the cable shown. In such an embodiment, carrier 23 would be positively driven in both its upward and downward movements.

We claim:

1. In an oven, the combination of a carrier frame, means in said oven mounting said carrier frame for vertical movement, a rack slidably carried by said carrier frame for in and out movement relative thereto, first motor means for raising and lowering said carrier frame, second motor means for shifting said rack relative to said frame, first switch means for controlling said first motor means said first switch means including means for preselecting the height to which said carrier frame is shifted and second switch means for controlling the second motor means.

2. In an oven, the combination of a carrier frame, means in said oven mounting said carrier frame for vertical movement, a rack slidably carried by said carrier frame for in and out movement relative thereto, first motor means for raising and lowering said carrier frame, second motor means for shifting said rack relative to said carrier frame, first switch means for controlling said first motor means and second switch means for controlling the second motor means, and third electrically responsive means for preventing movement of the carrier frame, said third means being rendered ineffective by energization of said first motor means.

3. In an oven, the combination of a carrier frame, means in said oven mounting said carrier frame for vertical movement, a rack slidably carried by said carrier frame for horizontal in and out movement relative thereto, first motor means for raising and lowering said carrier frame, second means for shifting said rack horizontally relative to said carrier frame, said second means comprising an electrical motor, a screw, means rotatably mounting said screw adjacent to the top of said oven, said screw extending parallel to the direction of rack movement, means mechanically interconnecting said motor and said screw, a threaded sleeve in engagement with said screw, a rod depending from said sleeve, said rack having a portion slidably embracing said rod, whereby said rod is effective to shift said rack horizontally irrespective of the height of said carrier frame, first switch means for controlling said first motor means, and second switch means for controlling said second means, said first switch means including means for preselecting the height to which said carrier frame is shifted.

4. In an oven, the combination of a carrier frame, means in said oven mounting said carrier frame for vertical movement, a rack slidably carried by said carrier frame for horizontal in and out movement relative thereto, first motor means for raising and lowering said carrier frame, second means for shifting said rack horizontally relative to said carrier frame, said second means comprising an electrical motor, a screw, means rotatably mounting said screw adjacent to the top of said oven, said screw extending parallel to the direction of rack movement, means mechanically interconnecting said motor and said screw, a threaded sleeve in engagement with said screw, a rod depending from said sleeve, said rack having a portion disposed adjacent to the innermost edge of said rack in slidable engagement with said rod, said carrier frame having a longitudinal channel formed therein for receiving said rod and permitting movement of said rod parallel to said screw, whereby said rod is effective to shift said rack horizontally irrespective of the height of said carrier frame, first switch means for controlling said first motor means, and second switch means for controlling said second means, said first switch means including means for preselecting the height to which said carrier frame is shifted 5. In an oven, the combination of a carrier frame, means in said oven for mounting said carrier frame for vertical movement, said means comprising four vertical corner posts, said carrier frame having elongated sleeves slidably engaging said posts, a rack slidably carried by said carrier frame for horizontal in and out movement relative thereto, first motor means for raising and lowering said carrier frame, second means for shifting said rack horizontally relative to said carrier frame, said second means comprising an electrical motor, a screw, means rotatably mounting said screw adjacent to the top of said oven, said screw extending parallel to the direction of rack movement, means mechanically interconnecting said motor and said screw, a threaded sleeve in engagement with said screw, a rod depending from said sleeve, said rack having a portion slidably embracing said rod, whereby said rod is effective to shift said rack horizontally irrespective of the height of said carrier frame, first switch means for controlling said first motor means, and second switch means for controlling said second means, said first switch means including means for preselecting the height to which said carrier frame is shifted.

6. In an oven, the combination of a carrier frame, means in said oven for mounting said carrier frame for vertical movement, said means comprising four vertical corner posts, said carrier frame having elongated sleeves slidably engaging said posts, a rack slidably carried by said carrier frame for horizontal in and out movement relative thereto, first motor means for raising and lowering said carrier frame, a drum connected to said motor, a flexible cable wound about said drum and attached to said carrier, second means for shifting said rack horizontally relative to said carrier frame, said second means comprising an electrical motor, a screw, means rotatably mounting said screw adjacent to the top of said oven, said screw extending parallel to the direction of rack movement, means mechanically interconnecting said motor and said screw, a threaded sleeve in engagement with said screw, a rod depending from said sleeve, said rack having a portion slidably embracing said rod, whereby said rod is effective to shift said rack horizontally irrespective of the height of said carrier frame, first switch means for controlling said first motor means, and second switch means for controlling said second means, said first switch means including means for preselecting the height to which said carrier frame is shifted.

7. In an oven, the combination of a carrier frame, means in said oven mounting said carrier frame for vertical movement, a rack slidably carried by said carrier frame for horizontal in and out movement relative thereto, first motor means for raising and lowering said carrier frame, second means for shifting said rack horizontally relative to said carrier frame, said first means comprising an electrical motor, a drum interconnected to said motor, a cable wound about said drum and interconnected to said carrier frame, said cable being effective to raise said carrier frame upon rotation of said drum in one direction and lower said carrier frame upon rotatation of said drum in the opposite direction, and selectively operable switch means for controlling the direction of rotation of said motor and said drum, said switch means including means for preselecting the height to which said carrier frame is shifted.

8. In an oven, the combination of a carrier frame, means in said oven mounting said carrier frame for vertical movement, a rack slidably carried by said carrier frame for horizontal in and out movement relative thereto, first motor means for raising and lowering said carrier frame, second means for shifting said rack horizontally relative to said carrier frame, said first means comprising an electrical motor, a drum interconnected to said motor, a cable wound about said drum and interconnected to said carrier frame, said cable being effective to raise said carrier frame upon rotation of said drum in one direction and lower said carrier frame upon rotation of said drum in the opposite direction, and selectively operable switch means for controlling the direction of rotation of said motor and said drum, said selectively operable switch means comprising a first switch effective when closed to energize said motor to operate so as to lower said carrier frame, said motor always being initially driven to lower said carrier frame when said selectively operable switch means is actuated, and means for subsequently raising said carrier frame to a selected position.

9. In an oven, the combination of a carrier frame, means in said oven mounting said carrier frame for vertical movement, a rack slidably carried by said carrier frame for horizontal in and out movement relative thereto, first motor means for raising and lowering said carrier frame, second means for shifting said rack horizontally relative to said carrier frame, said first means comprising an electrical motor, a drum interconnected to said motor, a cable wound about said drum and interconnected to said carrier frame, said cable being effective to raise said carrier frame upon rotation of said drum in one direction and lower said carrier frame upon rotation of said drum in the opposite direction, and selectively operable switch means for controlling the direction of rotation of said motor and said drum, said selectively operable switch means comprising a first switch effective when closed to energize said motor to operate so as to lower said carrier frame, and a second switch energized when said carrier frame reaches a predetermined position to cause said motor to be operated in the opposite direction.

10. In an oven, the combination of a carrier frame, means in said oven mounting said carrier frame for vertical movement, a rack slidably carried by said carrier frame for horizontal in and out movement relative thereto, first motor means for raising and lowering said carrier frame, second means for shifting said rack horizontally relative to said carrier frame, said first means comprising an electrical motor, a drum interconnected to said motor, a cable wound about said drum and interconnected to said carrier frame, said cable being effective to raise said carrier frame upon rotation of said drum in one direction and lower said carrier frame upon rotaton of said drum in the oppoiste direction, and selectively operable switch means for controlling the direction of rotation of said motor and said drum, said selectively operable switch means comprising a first switch effective when closed to energize said motor to operate so as to lower said carrier frame, and a second switch energized when said carrier frame reaches a predetermined position to cause said motor to be operated in the opposite direction, and means for deenergizing said first switch when said frame reaches a preselected height.

11. In an oven, the combination of a carrier frame, means in said oven mounting said carrier frame for vertical movement, a rack slidably carried by said carrier frame for horizontal in and out movement relative thereto, first motor means for raising and lowering said carrier frame, second means for shifting said rack horizontally relative to said carrier frame, said first means comprising an electrical motor, a drum interconnected to said motor, a cable wound about said drum and interconnected to said carrier frame, said cable being effective to raise said carrier frame upon rotation of said drum in one direction and lower said carrier frame upon rotation of said drum in the opposite direction, and selectively operable switch means for controlling the direction of rotation of said motor and said drum, said selectively operable switch means comprising a first switch effective when closed to energize said motor to operate so as to lower said carrier frame, and a second switch energized when said carrier reaches a predetermined position to cause said motor to be operated in the opposite direction, and means for deenergizing said first switch when said carrier frame reaches a preselected height, said last named means comprising a rotatable cam member, means interconnecting said cam member for rotation with said motor, said cam member being effective to actuate said first switch.

12. In an oven, the combination of a carrier frame, means in said oven mounting said carrier frame for vertical movement, a rack slidably carried by said carrier frame for horizontal in and out movement relative thereto, first motor means for raising and lowering said carrier frame, second means for shifting said rack horizontally relative to said carrier frame, said first means comprising an electrical motor, a drum interconnected to said motor, a cable wound about said drum and interconnected to said carrier frame, said cable being effective to raise said carrier frame upon rotation of said drum in one direction and lower said carrier frame upon rotation of said drum in the opposite direction, and selectively operable switch means for controlling the direction of rotation of said motor and said drum, said selectively operable switch means comprising a first switch effective when closed to energize said motor to operate so as to lower said carrier frame, and a second switch energized when said carrier frame reaches a predetermined position to cause said motor to be operated in the opposite direction, and means for deenergizing said first switch when said carrier frame reaches a preselected height, said last named means comprising a rotatable cam member, means interconnecting said cam member for rotation with said motor, said cam member being effective to actuate said first switch, and an actuating member, positioned intermediate said cam member and said first switch for actuating said switch when said cam reaches a preselected position.

13. In an oven, the combination of a carrier frame, means in said oven mounting said carrier frame for vertical movement, a rack slidably carried by said carrier frame for horizontal in and out movement relative thereto, first motor means for raising and lowering said carrier frame, second means for shifting said rack horizontally relative to said carrier frame, said first means comprising an electrical motor, drive means interconnected to said motor, and to said carrier frame, said drive means being effective to raise said carrier frame when said motor is driven in one direction and being effective to lower said carrier frame when said motor is driven in the opposite direction, and selectively operable switch means for controlling the direction of rotation of said motor, said selectively operable switch means comprising a first switch effective when closed to energize said motor to operate so as to lower said carrier frame, and a reversing switch energized when said carrier reaches a predetermined position to cause said motor to be operated in the opposite direction.

14. In an oven, the combination of a carrier frame, means in said oven mounting said carrier frame for vertical movement, a rack slidably carried by said carrier frame for horizontal in and out movement relative thereto, first motor means for raising and lowering said carrier frame, second means for shifting said rack horizontally relative to said carrier frame, said first means comprising an electrical motor, drive means interconnected to said motor, and to said carrier frame, said drive means being effective to raise said carrier frame when said motor is driven in one direction and being effective to lower said carrier frame when said motor is driven in the opposite direction, and selectively operable switch means for controlling the direction of rotation of said motor, said selectively operable switch means comprising a first switch effective when closed to energize said motor to operate so as to lower said carrier frame, and a reversing switch energized when said carrier reaches a predetermined position to cause said motor to be operated in the opposite direction, and means deenergizing said motor when said carrier frame reaches a preselected height.

References Cited in the file of this patent

UNITED STATES PATENTS

| | | |
|---|---|---|
| 1,700,560 | Coe | Jan. 29, 1929 |
| 1,851,182 | Hill | Mar. 29, 1932 |
| 1,851,183 | Hill | Mar. 29, 1932 |
| 2,073,240 | Kahn | Mar. 9, 1937 |
| 2,077,739 | Bryant | Apr. 20, 1937 |
| 2,812,415 | Markowitz | Nov. 5, 1957 |
| 2,829,022 | Lewis | Apr. 1, 1958 |
| 2,889,442 | Schultz | June 2, 1959 |
| 2,919,691 | Rinaldo et al. | Jan. 5, 1960 |
| 2,921,175 | Zaidan | Jan. 12, 1960 |
| 2,944,540 | Littell | July 12, 1960 |